United States Patent [19]

OKamoto et al.

[11] Patent Number: 5,417,808
[45] Date of Patent: May 23, 1995

[54] DEINKING COMPOSITION FOR FLOTATION AND DEINKING METHOD

[75] Inventors: Yutaka OKamoto, Koganei; Yoshie Hirakouchi, Koga; Masaaki Hagiwara, Kokubunji, all of Japan

[73] Assignee: Lion Corporation, Tokyo, Japan

[21] Appl. No.: 11,627

[22] Filed: Feb. 1, 1993

Related U.S. Application Data

[63] Continuation-in-part of Ser. No. 935,436, Aug. 26, 1992, abandoned.

[30] Foreign Application Priority Data

Aug. 30, 1991 [JP] Japan .................. 3-220427

[51] Int. Cl.⁶ .............................................. D21C 5/02
[52] U.S. Cl. .................... 162/5; 252/174.22
[58] Field of Search ............ 162/5; 252/60, 61, 174.22

[56] References Cited

U.S. PATENT DOCUMENTS

| | | | |
|---|---|---|---|
| 2,856,434 | 10/1958 | Niederhauser et al. | 260/613 |
| 2,903,486 | 9/1959 | Brown et al. | 260/613 |
| 3,021,372 | 2/1962 | Dupre et al. | 260/613 |
| 3,340,309 | 9/1967 | Weipert | 260/615 |
| 3,444,242 | 5/1969 | Rue et al. | 260/611 |
| 3,625,909 | 12/1971 | Berg et al. | 252/153 |

(List continued on next page.)

FOREIGN PATENT DOCUMENTS

| | | | |
|---|---|---|---|
| 729071 | 3/1966 | Canada . | |
| 2063278 | 12/1992 | Canada | 252/174.22 |
| 2143912 | 3/1973 | Germany . | |
| 50-142804 | 11/1975 | Japan . | |
| 51-84905 | 7/1976 | Japan . | |
| 53-31804 | 3/1978 | Japan . | |
| 55-51891 | 4/1980 | Japan . | |
| 51892 | 4/1980 | Japan | 162/5 |
| 56-79795 | 6/1981 | Japan . | |
| 41386 | 2/1986 | Japan | 162/5 |

(List continued on next page.)

OTHER PUBLICATIONS

Database WPIL, Section Ch, Week 8615, Derwent Publications Ltd., London, GB; Class A97, AN 86–097042 & JP–A–61 041 386 (Kurita Water Ind. KK) (27 Feb. 1986).

Makoto Hiraoka, *The Utilization of Waste Paper for*

(List continued on next page.)

*Primary Examiner*—Geoffrey L. Knable
*Attorney, Agent, or Firm*—Burns, Doane, Swecker & Mathis

[57] ABSTRACT

A deinking composition for regeneration of waste paper by floatation comprises 99.7 to 97% by weight of a mixture which comprises monoalkyl ethers of ethylene oxide/propylene oxide copolymers represented by the following general formulas (A) and (B) and the mixing ratio of the compound (A) to the compound (B) ranges from 10:90 to 90:10 (weight ratio); and about 0.3 to about 3.0% by weight of a polyoxyalkylene oxide selected from the group consisting of polyethylene oxides, polypropylene oxide and ethylene oxide/propylene oxide copolymers:

$$R^1O-(PO)_{n1}-[(EO)_m \cdot (PO)_{n2}]-H \quad (A)$$

$$R^2O-(EO)_{m1}-[(EO)_{m2} \cdot (PO)_n]-H \quad (B)$$

wherein $m/(n1+n2)$ ranges from 0.5 to 1.5; $(m1+m2)/n$ ranges from 1.1 to 2.0; EO and PO represent ethylene oxide and propylene oxide units respectively; and the EO and PO in the brackets may be in either a random or block configuration. The deinking composition exhibits excellent deinking properties. Therefore, the use of the deinking composition in the flotation method makes it possible to prepare high quality regenerated pulp, for paper-making, having a high brightness and a low content of remaining ink.

2 Claims, No Drawings

U.S. PATENT DOCUMENTS

| | | |
|---|---|---|
| 4,162,186 | 7/1979 | Wood et al. ............................ 162/5 |
| 4,483,741 | 11/1984 | Maloney et al. ........................ 162/5 |
| 4,518,459 | 5/1985 | Freis et al. ............................. 162/5 |
| 4,666,558 | 5/1987 | Wood et al. . |
| 5,019,291 | 5/1991 | Faulks ............................ 252/174.22 |

FOREIGN PATENT DOCUMENTS

| | | |
|---|---|---|
| 61-186592 | 8/1986 | Japan . |
| 62-177291 | 8/1987 | Japan . |
| 62-250291 | 10/1987 | Japan . |
| 63-165591 | 7/1988 | Japan . |
| 2063326 | 11/1980 | United Kingdom . |

OTHER PUBLICATIONS

*Energy Saving*, Japan TAPPI Journal, November, vol. 36, pp. 1029–1039.

Fumihiko Togashi, Kenichi Katabe, *Deinking Agent for Wastenewspaper*, Japan TAPPI Journal, November, vol. 39, pp. 747–756.

Andy Harrison, *Flotation Deinking is Critical in Unit Process Method of Deinking*, Pulp & Paper, Mar. 1989, pp. 60–65.

Robert G. Horacek, Benht Jarrehult, *Chemical Application Expands in Washing/Flotation Deinking Systems*, Pulp & Paper, Mar. 1989, pp. 97–99.

Kenneth E. Schriver, *Mill Chemistry Must Be Considered Before Making Deink Lind Decision*, Pulp & Paper, Mar. 1990, pp. 76–79.

Japanese Journal of Paper Technology, Aug. 1980, pp. 37–43.

DEINKING COMPOSITION FOR FLOTATION AND DEINKING METHOD

CROSS-REFERENCE TO RELATED APPLICATION

The present application is a continuation-in-part of U.S. application Ser. No. 07/935,436 filed on Aug. 26, 1992, now abandoned.

BACKGROUND OF THE INVENTION

The present invention relates to a deinking composition for reclaiming waste paper, which is used in the preparation of regenerated pulp from printed waste paper such as newspaper, magazines, journals, wood-free paper, copying paper and computer printout paper and a method for using the deinking composition.

More specifically, the present invention relates to a deinking composition and a method of using the same, which are suitable for deinking printed waste paper through flotation, can provide high quality regenerated pulp having a high brightness and a low content of residual ink and can ensure a stable deinking operation.

There has long been known methods for reclaiming printed waste paper to give starting materials for paper-making. In particular, the reclaiming of printed waste paper has increasingly become important from the viewpoint of saving energy and natural resources as well as protection of environment and correspondingly there have been required for the development of techniques capable of providing high quality regenerated pulp having excellent properties such as a high brightness and a low content of residual ink.

In general, methods for deinking printed waste paper can roughly be divided into two groups, one of which is a washing method and the other of which is a flotation method. There have been known a variety of literatures and knowledges relating to these processing methods, deinking mechanisms and difference in quality between deinking compositions used in these processing methods. See, for instance, Pulp & Paper, 1986, Nov., p. 59; Pulp & Paper, 1989, Mar., p. 60; Pulp & Paper, 1990, Mar., p. 76; Pulp & Paper, 1989, Mar., p. 97; Japanese Journal of Paper Technology, 1980, Aug., p. 37; 1989 TAPPI Pulping Conference, p. 343; Japan TAPPI Journal, Vol. 36, p. 1029; Japan TAPPI Journal, Vol. 39, p. 747; and U.S. Patent Nos. 4,483,741 and 4,518,459.

When summarizing literatures and, knowledges and experieneces which have been obtained through practical operations, the washing method in general comprises the step of repeatedly diluting and dehydrating a pulp slurry, or removing separated and dispersed ink particles from the pulp slurry through a screen or with a washing equipment such as a centrifugal cleaner. In this method, the separation of ink is greatly dependent upon, principally, mechanical conditions for due to washing equipments such as a press, a screen and a cleaner. Moreover, the washing method suffers from various problems concerning consumption of natural resources and energy since the use of a large amount of water is required. In addition, the washing method is greatly dependent upon mechanical factors and, therefore, workability of each step is regarded as important. In particular, when a composition having an intensive foaming ability, in particular, a deinking composition is employed, troubles due to foams arise in each equipment or process and this leads to reduction of workability and a marked increase in consumption of electric power. Thus, a composition having a low foaming ability or foaming-inhibitory properties must be used in the washing mehods. Further the separated ink particles must be fine and well dispersed in a pulp slurry in order to improve the efficiency of removing the separated ink.

On the other hand, the flotation method mainly comprises removing separated ink particles from a pulp slurry by adhering the ink particles to foams generated in a flotator. Thus, the mechanism of the removal of ink for the flotation method is completely different from that for the washing method and in other words, inks are principally removed through chemical processes unlike the washing method. The deinking method in which the flotation process is adopted sometimes comprises a so-called washing or dewatering step, but the separated ink particles are mainly removed in the flotation process. The flotation method is advantageous in saving natural resources since the amount of water used in this method is smaller than that required for the washing method. To improve the effect of removing inks in the flotation method, the separated ink particles must be coagulated to form aggregates having a relatively large particle size. Moreover, an appropriate foaming ability is required for the flotation process since the separated ink particles must be removed through the adhesion thereof to foams in the flotation method. This foaming ability required for the flotation method is higher than that required for the washing method. On the other hand, if the foaming ability of a composition, in particular, that of a deinking composition is too high, various problems arise. For instance, it is difficult to scrape out foams during the flotation process and various troubles due to foaming arise in each step. This leads to the interruption of the operation and the yield of pulp is reduced. Accordingly, the deinking process cannot be carried out stably and it is sometimes difficult to obtain high quality regenerated pulp having a high brightness.

As has been discussed above in detail, the deinking mechanism for washing method is quite different from that for the flotation method and, therefore, they require the use of deinking compositions having different properties.

The flotation method has been adopted mainly in Japan and Europe because it can provide regenerated pulp having a brightness higher than that accomplished by the washing method and is excellent in saving in natural resources and energy as compared with the washing method. Moreover, the deinking method has recently been switched from the washing method to the flotation method likewise in the United States.

Until now, there have been filed a variety of patents relating to deinking compositions and methods for using the same. For instance, U.S. Pat. No. 4,518,459 discloses a deinking method using a deinking composition obtained by adding a predetermined amount of propylene oxide to the terminal hydroxyl groups of alcohols or ethylene oxide adducts of alkylphenols, or by modifying, with benzyl ether, the terminal hydroxyl groups of alcohols or ethylene oxide- or ethylene oxide/propylene oxide block-adducts of alkylphenols. However, the method of this U.S. Patent relates to a washing method, while the present invention relates to a flotation method. Thus, the functions and properties of the deinking composition according to the present invention are quite different from those of the compositions used in the U.S. Patent. More specifically, the U.S. patent relates to deinking compositions particularly suitable for washing methods which require low foaming abilities or low forming-inhibitory effects, while the deinking compositions of the present invention are designed such that they can ensure a stable operation during the flotation step and that they have appropriate foaming abilities.

DE-2143912 likewise discloses a deinking method which uses a deinking composition obtained by adding ethylene oxide and propylene oxide to an alcohol or an alkylphenol to a desired extent and the flotation step is carried out at a temperature of not less than the clouding point of the deinking composition, but the method does not provide a high quality regenerated pulp having a high brightness and a low content of residual ink.

Japanese Unexamined Patent Publication (hereinafter referred to as "J.P. KOKAI") Nos. Sho 51-84905, Sho 53-31804, Sho 55-51891, Sho 55-51892 and Sho 56-79795 disclose deinking compositions comprising alkylene oxide adducts of alcohols or alkylphenols. However, these deinking compositions have foaming abilities higher than those required for each step and cannot ensure stable operations during flotation since the foaming leads to interruption of the deinking operation and a decrease in the yield of the deinking method. In addition, the deinking compositions do not exhibit sufficient abilities of trapping ink particles during the flotation and hence fin not always provide high quality regenerated pulp having a high brightness and a low content of residual ink.

J.P. KOKAI No. Sho 61-41386 discloses the use of a composition comprising an alkylene oxide adduct of an alcohol and an ethylene oxide adduct of an alcohol, but the composition does not have an ability of trapping ink particles. The ethylene oxide adduct of alcohol used in this method rather has high ability of dispersing ink. Therefore, the flotation method using this deinking composition cannot provide high quality regenerated pulp and stable operability. J.P. KOKAI Nos. Sho 50-142804, Sho 61-186592, Sho 62-177291 and Sho 62-250291 disclose deinking compositions comprising alkylene oxide adducts of alcohols and higher fatty acids which can improve the ink-trapping properties of the alkylene oxide adducts of alcohols required for the flotation process. These compositions can improve the ink-trapping ability, but the use of these compositions makes it difficult to control foaming during flotation and to perform stable operation. J.P. KOKAI No. Sho 63-165591 discloses deinking compositions comprising alkylene oxide adducts of alcohols and alkylene oxide adducts of fatty acids for improving the ink-trapping ability of the alkylene oxide adducts of alcohols required for the flotation process. However, the use of these deinking compositions do not always provide stable operability during a deinking method in which a flotation process is included.

The deinking compositions disclosed in the foregoing German Patent and Japanese Unexamined Patent Publications do not always ensure stable operability and do not provide high quality regenerated pulp having a high brightness and a low content of residual ink, while the deinking composition provided by the present invention comprises a combination of two kinds of different specific deinking compositions which are designed such that they can ensure stable operation and can provide high quality regenerated pulp having a high brightness and a low content of residual ink. Moreover, the foregoing references do not disclose the influences of by-products simultaneously formed during the preparation of the deinking compositions on the deinking properties of the resulting deinking compositions.

Further Canadian Patent No. 729,071 discloses a deinking composition comprising an alkylphenol to which an alkylene oxide is added, but the deinking composition does not exhibit sufficient ink-trapping properties when it is used in the flotation method and cannot provide high quality regenerated pulp. In addition, it is not preferred from the viewpoint of protection of environment since alkylphenols are in general less biodegradable.

U.S. Pat. Nos. 3,021,372; 2,856,434; 2,903,486; 3,340,309; 3,444,242 and 3,625,909 disclose compounds which are prepared by adding alkylene oxides to alcohols or alkylphenols, but these compounds quite differ, in structures and applications, from those of the present invention. U.S. Pat. No. 4,162,186 also discloses a deinking composition, but the deinking composition comprises a combination of an oil-soluble alcohol ethoxylate with a water-soluble alcohol ethoxylate and completely differs from the deinking composition of the present invention.

SUMMARY OF THE INVENTION

Accordingly, a primary object of the present invention is to provide a deinking composition exhibiting good deinking properties in the flotation method.

Another object of the present invention is to provide a deinking composition for regeneration of waste paper which can be used in a deinking method including a flotation step and can provide high quality regenerated pulp having a high brightness and a low content of residual ink and which can ensure stable operation of the deinking method.

Another object of the present invention is to provide a flotation method for effectively deinking from waste paper.

Another object of the present invention is to provide a flotation method for effectively deinking from waste paper which can provide high quality regenerated pulp having a high brightness and a low content of residual ink and which can ensure stable operation.

These and other objects of the present invention will be apparent from the following description and Examples.

The present invention has been completed on the basis of the finding that the foregoing objects of the present invention can effectively be accomplished by simultaneously using, as a deinking composition, different monoalkyl ethers of ethylene oxide-propylen oxide copolymers whose average-added molar number m of the propylene oxide and that n of the propylene oxide fall within specific ranges respectively and have structures different from one another and by simultaneously using the deinking composition with a predetemined amount of a polyalkylene oxide.

According to the first aspect of the present invention, there is provided a deinking composition for flotation which comprises 99.7 to 97% by weight of a mixture comprising monoalkyl ethers of ethylene oxide/propylene oxide copolymers represented by the following general formulas (A) and (B) whose averaged molar number m of the added ethylene oxide moieties ranges from 10 to 30 and averaged molar number n of the added propylene oxide moieties ranges from 8 to 35, the alkyl group of the compound represented by the formula (A) having 12 to 22 carbon atoms, the alkyl group of the compound represented by the formula (B) having 16 to 24 carbon atoms and the mixing ratio of the compound (A) to the compound (B) ranging from 10:90 to 90:10 (weight ratio); and about 0.3 to about 3.0% by weight of a polyalkylene oxide selected from the group consisting of polyethylene oxides, polypropylene oxides and ethylene oxide/propylene oxide copolymers:

$$R^1O-(PO)_{n1}-[(EO)_m\cdot(PO)_{n2}]-H \quad (A)$$

$$R^2O-(EO)_{m1}-[(EO)_{m2}\cdot(PO)_n]-H \quad (B)$$

wherein $R^1$ represents an alkyl group having 12 to 22 carbon atoms; $R^2$ represents an alkyl group having 16 to 24 carbon atoms; $m/(n1+n2)=0.5\sim1.5$; $(m1+m2)/n=1.1\sim2.0$, provided that m ($=m1+m2$) ranges from 10 to 30 and that n ($=n1+n2$) ranges from 8 to 35; and EO and PO represent ethylene oxide and propylene oxide units respectively, the EO and PO in the brackets being in the form of either a random or block configuration.

According to the second aspect of the present invention, there is provided a deinking composition for flotation which comprises 99.7 to 97% by weight of a mixture comprising monoalkyl ethers of ethylene oxide/propylene oxide copolymers represented by the following general formulas (A-1) and (A-2) whose averaged molar number m of the added ethylene oxide moieties ranges from 10 to 30 and averaged molar number n of the added propylene oxide moieties ranges from 8 to 35, the alkyl group of the compound represented by the formulae (A-1) and (A-2) having 12 to 22 carbon atoms and the mixing ratio of the compound (A-1) to the compound (A-2) ranging from 10:90 to 90:10 (weight ratio); and about 0.3 to about 3.0% by weight of a polyalkylene oxide selected from the group consisting of polyethylene oxides, polypropylene oxides and ethylene oxide/propylene oxide copolymers:

$$R^3O-(P))_{n3}-(EO)_m\cdot(PO)_{n4}-H \quad (A-1)$$

$$R^4O-(PO)_{n5}-[(EO)_m\cdot(PO)_{n6}]-H \quad (A-2)$$

wherein $R^3$ and $R^4$ independently represents an alkyl group having 12 to 22 carbon atoms; $m/(n3+n4)=0.5\sim1.5$; $m/(n5+n6)=0.5\sim1.5$, provided that m ranges from 10 to 30 and that n ($=n3+n4$ or $=n5+n6$) ranges from 8 to 35; and EO and PO represent ethylene oxide and propylene oxide units respectively, $(EO)_m\cdot(PO)_{n4}$ being in the form of a block configuration and $[(EO)_m\cdot(PO)_{n6}]$ being in the form of a random configuration.

DESCRIPTION OF THE PREFERRED EMBODIMENTS

At first, the first aspect of the present invention will hereinafter be explained in more detail.

The ether compounds represented by the foregoing general formula (A) comprise higher alcohols carrying alkyl groups having 12 to 22 carbon atoms to which propylene oxide units are added through the oxygen atom, have a ratio of the total added molar number of ethylene moieties to that of propylene oxide moieties $(m/(n1+n2))$ ranging from 0.5 to 1.5, preferably 0.5 to 0.9. These ether compounds have hydrophobicity higher than those of the conventional deinking compositions of higher alcohol type and thus have a strong affinity to separate ink particles and ink-trapping properties required for the flotation process. Therefore, the deinking composition of the present invention makes it possible to efficiently separate and remove, from pulp, ink particles separated during the flotation through the adhesion thereof to the generated foams of the deinking composition and to hence provide regenerated pulp having a high brightness. If the added molar number ratio exceeds 1.5, the hydrophilicity of the deinking composition increases, while the affinity of the composition to ink particles and ink-trapping properties thereof are lowered. As a result, any regenerated pulp having a high brightness cannot be obtained. On the other hand, if it is less than 0.5, the deinking composition exhibits a low foaming ability during the flotation step, it is difficult to scrape out foams during the flotation. Moreover, the deinking composition does not exhibit sufficient ink-trapping properties and thus regenerated pulp having a sufficient brightness cannot be obtained. In addition, if the added molar number ratio is controlled to a range of from 0.5 to 0.9, the ink-trapping properties of the deinking composition is further improved.

On the other hand, the ether compound represented by the foregoing general formula (B) comprises a higher alcohol to which ethylene oxide moieties are first added and the compound exhibits a desired effect when the ratio of the total added molar number of the ethylene oxide moieties to that of the propylene oxide moieties. $(m1+m2)/n$, ranges from 1.1 to 2.0. In particular, The compound (B) has a high affinity to printed ink on the surface of paper and excellent in ink-separation properties in particular in defibering and aging steps. If the ratio exceeds 2.0, excess foaming is caused during the flotation process and thus stable operation cannot be ensured. Further, it is difficult to sufficiently scrape out foams generated and to obtain regenerated pulp having a high brightness. On the other hand, if the ratio is less than 1.1, the resulting deinking composition does not have a sufficient affinity to printed ink on the surface of paper required for the defibering and aging steps. This leads to a decrease in the ink-separation properties and hence to the formation of only pulp having a high content of residual ink.

The compound of Formula (A) is prepared by first adding, to a higher alcohol, at least one, preferably 1 to 5 moles of propylene oxide to give a propylene oxide adduct of the higher alcohol and then adding ethylene oxide and propylene oxide in either a random or block configuration. When ethylene oxide and propylene oxide are added to a higher alcohol in a block configuration, it is preferred to first add ethylene oxide to the alcohol and then propylene oxide to the resulting adduct. Alternatively, the compound of Formula (A) can be prepared by adding, to a higher alcohol, at least one mole of propylene oxide, then randomly adding ethylene oxide and propylene oxide and further adding propylene oxide to the end of the product.

On the other hand, the compound represented by the foregoing general formula (B) can be prepared by first adding, to a higher alcohol, at least one mole, preferably 1 to 8 moles of ethylene oxide to give an ethylene oxide adduct of the higher alcohol and then adding ethylene oxide and propylene oxide to the adduct in either a random or block configuration. When the ethylene oxide and propylene oxide are added in a block configuration, it is preferred to first add ethylene oxide and then propylene oxide to the resulting ethylene oxide adduct. Alternatively, the compound of Formula (B) can also be prepared by directly adding ethylene oxide and propylene oxide to a higher alcohol in a random configuration. In this case, ethylene oxide would be first added to the higher alcohol selectively since the reactivity of ethylene oxide with the alcohol is greater than that of propylene oxide.

When preparing the foregoing ether compounds, it is very important in the present invention to control the water content of the react ion system to not more than 0.3% and to add a catalyst, for instance, a basic catalyst such as sodium hydroxide or potassium hydroxide or a magnesium oxide-aluminum solid phase catalyst to the reaction system such that the amount of the catalyst is always maintained to not more than 0.25% with respect to an intermediate product or a final product in each alkylene oxide addition step in order to limit the content of by-products present in the final product such as polyethylene glycol, polypropylene glycol and polyalkylene glycols which are polymers of ethylene oxide and propylene oxide to about 0.3 to about 3% by weight. However, the content of the polyalkylene glycol can subsequently be adjusted to the range defined above through supplementation of a desired polyalkylene glycol.

The higher alcohols, from which the alcohol residues: $R^1O$ of the compound (A) are derived, are those having 12 to 22, preferably 16 to 22 and more preferably 18 to 22 carbon atoms, while the higher alcohols, from which the alcohol residues: $R^2O$ of the compound (B) are derived, are those having 16 to 24, preferably 18 to 22 carbon atoms. Specific examples of such higher alcohols include lauryl alcohol, myristyl alcohol, palmityl alcohol, heptadecanol, stearyl alcohol, nonadecanol, arachidic alcohol, behenyl alcohol, tricosanol, tetracosanol, oleyl alcohol, alcohols derived from animal and plant oil fatty acids such as tallow oil alcohol, fish oil alcohol, lard alcohol and hardened products thereof.

It is important requirements for the deinking composition that the composition has a total molar number of the added ethylene oxide moieties ranging from 10 to 30 moles, preferably 12 to 28 moles per mole of a higher alcohol expressed in terms of the charged molar number thereof and a total molar number of the added propylene oxide moieties ranging from 8 to 35 moles, preferably 9 to 30 moles per mole of a higher alcohol expressed in terms of the charged molar number thereof, that the ratio of the total molar number of the added ethylene oxide to the total molar number of the added propylene oxide ranges from 0.5 to 1.5, preferably 0.5 to 0.9 for the compound of Formula (A) or 1.1 to 2.0 for the compound of Formula (B) and that the carbon atom number of the alkyl group ranges from 12 to 22 for the compound of Formula (A) or 16 to 24 for the compound of Formula (B).

If the carbon atom numbers of the alkyl groups of these higher alcohols are smaller than each corresponding lower limit, the resulting compound has insufficient hydrophobicity because of short chain length of the alkyl group, the foaming ability thereof is correspondingly insufficient even if the molar numbers of added ethylene oxide and propylene oxide fall within the ranges defined above respectively, the ink-trapping ability thereof during flotation is likewise insufficient and separated ink particles are not sufficiently adhered to foams generated by the compound. Thus, high quality regenerated pulp having a high brightness cannot be obtained.

On the other hand, if the length of the alkyl group is longer than the upper limit defined above, the deinking composition is not sufficiently dissolved and dispersed in a medium during defibering and accordingly high quality regenerated pulp having a high brightness and a low content of remaining ink cannot be produced.

Further if the molar numbers of added ethylene oxide and propylene oxide as well as the ratio of the total molar number of the added ethylene oxide to the total molar number of the added propylene oxide are outside the foregoing corresponding ranges, the formation of high quality regenerated pulp and stable operation of the deinking treatment cannot be ensured even if the carbon atom numbers of the alkyl groups of the compounds of Formulas (A) and (B) fall within the ranges defined above.

Furthermore, it is also important requirements, when preparing the compounds, i.e., adding alkylene oxide to higher alcohols, that the reaction system is sufficiently purged with nitrogen gas and dehydrated at a high temperature under reduced pressure to control the water content to about 0.3% or less by weight prior to the addition of the alkylene oxide and that, upon preparing the ether compounds of Formulas (A) and (B), the amount of the catalyst is always maintained to not more than 0.25% with respect to an intermediate product or a final product in each alkylene oxide addition step, in order to limit the content of by-products present in the final product such as polyethylene glycol, polypropylene glycol and polyalkylene glycols which are polymers of ethylene oxide and propylene oxide to about 0.3 to about 3% by weight.

The amounts of water and catalyst greatly affect the amount of by-products, in particular polyethylene glycol, polypropylene glycol and polyalkylene glycols which are polymers of ethylene oxide and propylene oxide present in the final product as described in Journal of Japan Oil Chemist's Society, 1979, 28, p. 881. Therefore, the control of the amounts of water and catalyst is an essential requirement for limiting the amount of the by-products formed during the preparation of these ether compounds to a range of from about 0.3 to about 3% by weight.

The amount of these by-products should be limited to the range defined above for the following reason: polyethylene glycol, polypropylene glycol and polyalkylene glycols are well-known as compounds having high dispersion properties and foaming ability and, therefore, if they are present in an amount of more than about 3% by weight, they serve to disperse inks and strengthen the foaming ability during flotation. In particular, the use thereof adversely affect the flotation method which requires good ink-trapping properties and an appropriate foaming ability. Since these by-products do not have hydrophobic groups such as alkyl groups, they do not exhibit ink-trapping ability at all and accordingly, they do not serve to remove ink particles separated during the flotation from a pulp slurry. On the other hand, if the amount of these by-products is less than about 0.3% by weight, the resulting deinking composition does not exhibit an appropriate foaming ability during the flotation, the separated ink particles are not sufficiently trapped by the foams and thus regenerated pulp having a high brightness cannot be obtained.

The second aspect of the present invention will hereinafter be explained in more detail.

The feature of the second aspect of the present invention resides in employment of two ether compounds, the both of which belong in the ether compounds represented by the foregoing formula (A) and one of which is of block configuration and other of which is of random configuration.

The ether compounds represented by the foregoing general formula (A-1) may be prepared by adding to a higher alcohol carrying alkyl groups having 12 to 22 carbon atoms propylene oxides, ethylene oxides and propylene oxides in this order so as to form it in the block configuration. In this respect, it is preferable that a ratio of the total added molar number of ethylene moieties to that of propylene oxide moieties $(m/(n3+n4))$ be from 0.5 to 1.5, more preferably 0.5 to 0.9. These ether compounds have a strong affinity to separate ink particles and ink-trapping properties required for the flotation process, compared with those of the conventional deinking compositions of higher alcohol type. Therefore, it is possible to efficiently separate and remove, from pulp, ink particles (in particuler, ink particles of not larger than 4 μm) separated during the flotation through the adhesion thereof to the generated foams of the deinking composition and to hence provide regenerated pulp having a high brightness and high b value which indicates less dark color. If the added molar number ratio exceeds 1.5, the hydrophilicity of the deinking composition increases, while ink-trapping properties thereof are lowered. As a result, any regenerated pulp having a high brightness cannot be obtained. On the other hand, if it is less than 0.5, the deinking composition exhibits a low foaming ability during the flotation step, it is difficult to scrape out foams during the flotation. In addition, if the added molar number ratio is controlled to a range of from 0.5 to 0.9, the ink-trapping properties of the deinking composition is further improved.

On the other hand, the ether compound represented by the foregoing general formula (A-2) may be prepared by adding propylene oxides to a higher alcohol carrying alkyl groups having 12 to 22 carbon atoms and then adding a mixture of ethylene oxides and propylene oxides thereto so as to form it in a random configuration. In this respect, it is preferable that a ratio of the total added molar number of ethylene moieties to that of propylene oxide moieties $(m/(n5+n6))$ be from 0.5 to 1.5, more preferably 0.5 to 0.9. These ether compounds have a strong affinity to separate ink particles and ink-trapping properties required for the flotation process. The membrane (comprising the compounds) of the foams formed at the flotation is of high viscosity, so that a constant forming can be maintained even if amount and quality of the wasted paper varies. Therefore, it is possible to efficiently separate and remove, from pulp, ink particles separated during the flotation through the adhesion thereof to the generated foams of the deinking composition and to hence provide regenerated pulp having a high brightness. If the added molar number ratio exceeds 1.5, the viscosity of the membrane of the foams increases, while ink-trapping properties thereof are lowered and an amount of foams become excess, so that it is not possible to maintain a stable operation and it is difficult to scrape out foams during the flotation. As a result, any regenerated pulp having a high brightness cannot be obtained. On the other hand, if it is less than 0.5, the viscosity of the membrane of the foams lowers, foaming at the flotation becomes insufficient and therefore, sufficient ink-trapping properties required for the flotation process cannot be obtained.

The weight of ratio of compound (A-1) to compound (A-2) is 90/10 to 10/90, preferably 85/15 to 15/85. In the second aspect of the invention, compound (B) may be added to the combination of components (A-1) and (A-2).

The conditions for preparing the ether compounds (A-1) and (A-2), starting materials, control of the formation of by-product and the like are the same as those mentioned with respect to the first aspect of the present invention.

In the deinking process which is usually employed and comprises defibering and/or aging steps, the deinking compositions of the first and second aspects of the present invention can be used by adding, in portions, to either or both of the defibering and aging steps.

In order to obtain high quality regenerated pulp, the deinking composition of the present invention should be added to a defibering step (or an equipment, pulper). Alternatively, to obtain a regenerated pulp having higher quality, the deinking process preferably comprises an aging step after the defibering step. The deinking composition may be added, in portions, to either or both of these defibering and aging steps, but is preferably added, in portions, to both of these defibering and aging steps.

As has already been discussed above, the deinking process can roughly be divided into two groups, i.e., a washing method and a flotation method. The deinking method in general comprises defibering, aging and washing or flotation steps. The defibering and aging steps are performed for separating ink printed on the surface of paper and finely dispersing the separated ink particles. Moreover, the washing step is carried out while the ink particles are dispersed as has been described above, but in the flotation step, the ink particles dispersed in a slurry must be coagulated during the defibering and aging steps. In other words, the washing step and the aging step require dispersed conditions of ink particles which oppose to each other. Accordingly, the deinking composition used in the flotation step must have abilities of separating and dispersing ink and an ability of coagulating the dispersed ink particles and these properties are opposed to one another. On the other hand, deinking composition required for three steps: defibering, aging and washing steps in the washing method may have the same properties.

However, the foregoing problems can be solved by the use of two different kinds of deinking compositions (A) and (B) or compositions (A-1) and (A-2) according to the present invention.

The amount of the deinking composition of the present invention to be added to each of the defibering and aging steps ranges from 0.10 to 2%, preferably 0.15 to 1% on the basis of th weight of waste paper. This is because if the amount is less than the lower limit, high quality regenerated pulp having a high brightness cannot be obtained, the foaming ability achieved is insufficient and ink particles are not satisfactorily removed during the flotation, while if the amount exceeds the upper limit, foaming during the flotation is too severe to ensure stable operation. In this respect, if the deinking composition is added to both defibering and aging steps, the total amount thereof to be added to these steps ranges from 0.1 to 2.1% by weight, preferably 0.15 to 1.5% by weight.

When deinking is carried out using the deinking composition of the invention, the defibering step is preferably performed at a pulp concentration ranging from 4 to 25%, a temperature ranging from 20° to 70° in the presence of an alkaline agent such as sodium hydroxide, sodium silicate or sodium carbonate (pH=7.5 to 11.5, preferably 8.0 to 11.5) and optionally a bleaching agent such as hydrogen peroxide in addition to the deinking composition of the present invention. If the pulp concentration is less than 4% or the temperature is less than 20° C., the amount of undefibrated pulp increases since the frictional force between pulp fibers during defibering is low and the content of ink in the pulp increases. Thus, the resulting regenerated pulp cannot be used as starting material for paper-making. On the other hand, the pulp concentration exceeds 25% or the temperature is higher than 70° C., high quality regenerated pulp cannot be obtained since the frictional force between pulp fibers is extremely high and the strength of the resulting regenerated pulp is reduced due to frictional heat. Further, if the pH value during the defibering is less than 7.5, the degree of swelling of the pulp fibers during the defibering is low and accordingly the content of undefibrated fibers increases, the content of ink in the pulp increases and, therefore, high quality regenerated pulp cannot be prepared. Thus, the resulting regenerated pulp cannot be used as starting material for paper-making. If the pH value exceeds 11.5, the resulting pulp causes yellowing by alkali baking, thereby the reduction of brightness occurs, and the strength of the resulting reclaimed paper is accordingly lowered.

The aging step may be carried out employing the same compositions used in the defibering step. The aging step is preferably performed at a pulp concentration ranging from 10 to 30%, a temprature ranging from 30° to 80° C. for at least one hour. If the pulp concentration is less than 10n and the temperature is lower than 30° C., a sufficient aging effect cannot be ensured and accordingly high quality regenerated pulp cannot be obtained. If the temperature exceeds 80° C., the strength of the resulting reclaimed paper is lowered due to the effect of heat. Moreover, any significant aging effect cannot be anticipated even if the pulp concentration is increased to more than 30%. If pH for the aging step is lower than 8, any desired aging effect is not ensured. On the other hand, if the pH value exceeds 12, the resulting pulp causes yellowing due to the alkali baking and hence the brightness of the resulting pulp is impaired. Further, the strength of the resulting reclaimed paper is likewise lowered.

The separated ink can effectively be removed from the pulp slurry through the flotation performed at a pulp concentration of 0.5 to 1.5% and a temperature of 20° to 45° C.

The deinking method of the present invention may further comprise various steps commonly used in the deinking method such as dilution and/or dewatering steps, a screening step and treatments with a disperser and/or kneader without any influence on the quality of the resulting regenerated pulp and the operability of the method. In addition, the deinking composition of the present invention may likewise be added to an ink-separation step, for instance, to a kneader, a refiner and/or a disperser, in addition to the foregoing defibering and aging steps.

If the deinking composition of the present invention is used in the deinking step of the washing method, stable operation without accompanying any trouble due to foaming can be ensured and high quality regenerated pulp having a high brightness and a low content of remaining ink unlike the usual methods and those disclosed in known patents in which ethylene oxide/propylene oxide adducts of higher alcohols are used.

The deinking composition of the present invention can be used simultaneous with polyoxyalkylene alkyl ether sulfates, fatty acids or salts thereof and/or alkylene oxide adducts of rosin.

As has been explained above in detail, if the deinking composition of the present invention is used in the flotation method, excellent deinking effect can be anticipated and high quality regenerated pulp having a high brightness and a low content of remaining ink can be obtained. In particular, according to the present invention, an increase in the brightness of the resulting reclaimed paper of at least one rank higher than that observed for the conventional method can be achieved and the content of remaining ink is at least 25% lower than that observed when the compounds (A) and (B) or (A-1) and (A-2) are not simultaneously employed. Thus, the resulting reclaimed paper has a substantially improved brightness which can be recognized even with the naked eyes.

The present invention will hereinafter be explained in more detail with reference to the following Preparation Examples and non-limitative working Examples and the effects practically accomplished by the present invention will also be discussed in detail in comparison with Comparative Examples.

PREPARATION EXAMPLE 1

After charging 108.2 g (0.4 mole) of stearyl alcohol and 1.01 g (0.20% with respect to the final product) of KOH as a catalyst to an autoclave of stainless steel, the reaction system was sufficiently purged with nitrogen gas. Then the reaction system was sufficiently dehydrated at $135\pm5°$ C. for 0.5 hour under reduced pressure and 211.2 g (4.8 moles) of ethylene oxide was gradually added to the reaction system while maintaining the temperature and pressure at $125\pm5°$ C. and 1.0 to 3.0 kg/cm$^2$, respectively. After completion of the addition, the reaction system was matured at the reaction temperature for 2 hours and the unreacted ethylene oxide was removed under reduced pressure. Subsequently, 185.6 g (3.2 moles) of propylene oxide was gradually added while maintaining the temperature and pressure at $110\pm5°$ C. and 1.0 to 3.0 kg/cm$^2$, respectively. After completion of the addition, the reaction system was matured at the reaction temperature for 2 hours and the unreacted propylene oxide was removed under reduced pressure. Then acetic acid was added to adjust the pH of the reaction system to 6 to 8 (Sample 1).

The same procedures used above were repeated except that the conditions listed in Table 1 were used to give Samples 2 and 3.

PREPARATION EXAMPLE 2

After charging 108.2 g (0.4 mole) of stearyl alcohol and 1.27 g (0.2% with respect to the final product) of KOH as a catalyst to an autoclave of stainless steel, the reaction system was sufficiently purged with nitrogen gas. Then the reaction system was sufficiently dehydrated at 120° C. for 2.0 hours under reduced pressure and 35.2 g (0.8 mole) of ethylene oxide was gradually added to the reaction system while maintaining the temperature and pressure at $175\pm5°$ C. and 1.0 to 3.0 kg/cm$^2$, respectively. After completion of the addition, the reaction system was matured at the reaction temperature for 2 hours and the unreacted ethylene oxide was removed under reduced pressure. Subsequently, a mixture comprising 281.6 g (6.4 moles) of ethylene oxide and 208 g (3.6 moles) of propylene oxide was gradually added while maintaining the temperature and pressure at $120\pm5°$ C. and 1.0 to 3.0 kg/cm$^2$, respectively. After completion of the addition, the reaction system was matured at the reaction temperature for 2 hours and the unreacted ethylene oxide and propylene oxide were removed under reduced pressure. Then the reaction mixture was cooled, 0.18 g (0.20% with respect to the final product) of KOH as a catalyst was additionally supplemented, the reaction system was sufficiently purged with nitrogen gas. Thereafter the reaction system was sufficiently dehydrated at $120\pm5°$ C. for 2 hours under reduced pressure and 92.8 g (1.6 mole) of propylene oxide was gradually added to the reaction system while maintaining the temperature and pressure at $115\pm5°$ C. and 1.0 to 3.0 kg/cm$^2$, respectively. After completion of the addition, the unreacted propylene oxide was removed under reduced pressure, followed by cooling and addition of acetic acid to adjust the pH of the reaction system to 6 to 8 (Sample 4).

The same procedures used above were repeated except that propylene oxide was added after randomly adding, in advance, ethylene oxide and propylene oxide under the conditions listed in Table 1 to give Sample 5.

the reaction system was matured, the unreacted ethylene oxide and propylene oxide were removed under reduced pressure, followed by cooling and addition of acetic acid to adjust the pH of the reaction system to 6 to 8 (Sample 6).

The same procedures used above were repeated except that the conditions listed in Table 2 were adopted to give Samples 7, 10 and 11. When the added ethylene oxide and propylene oxide were in the block configuration, ethylene oxide was first added and then propylene oxide was added.

PREPARATION EXAMPLE 4

After charging 108.2 g (0.4 mole) of stearyl alcohol and 1.67 g (0.23% with respect to propylene oxide (5 moles).ethylene oxide (15 moles).propylene oxide (10 moles) adduct of stearyl alcohol) of KOH as a catalyst to an autoclave, the reaction system was sufficiently purged with nitrogen gas. Then the reaction system was sufficiently dehydrated at $125\pm5°$ C. for 1.5 hour under reduced pressure and 116 g (2 moles) of propylene oxide was gradually added to the reaction system while maintaining the temperature and pressure at $115\pm5°$ C. and 1.0 to 3.0 kg/cm$^2$, respectively. After completion of the addition, the reaction system was matured at the reac-

TABLE 1

| | RO · (EO) − [(EO)(PO)] H (Component (B)) | | | | |
|---|---|---|---|---|---|
| Sample No. | Alkyl Group (ratio: wt %) | Total EO; PO | [(EO)(PO)] Config. | EO/PO | By-product (%) |
| 1 | $C_{18}$ | 12; 8 | block | 1.50 | 1.25 |
| 2 | $C_{18}/C_{22}$ = 70:30 | 18; 9 | block | 2.00 | 2.15 |
| 3 | $C_{16}/C_{18}$ = 40/60 | 18; 16 | random | 1.13 | 1.15 |
| 4 | $C_{18}$ | 18; 10 | random, block*[1] | 1.80 | 2.25 |
| 5 | $C_{16}/C_{18}$ = 30/70 | 16; 13 | random, block*[1] | 1.23 | 2.15 |

*[1]: Ethylene oxide and propylene oxide are randomly added and then propylene oxide is further added.

Terminal added PO molar numbers are 4 for Sample 4 and 5 for Sample 5.

PREPARATION EXAMPLE 3

After charging 108.2 g (0.4 mole) of stearyl alcohol and 1.20 g (0.18% with respect to propylene oxide (1 mole) adduct of stearyl alcohol) of KOH as a catalyst to an autoclave, the react ion system was sufficiently purged with nitrogen gas. Then the reaction system was sufficiently dehydrated at $140\pm5°$ C. for one hour under reduced pressure and 23.2 g (0.4 moles) of propylene oxide was gradually added to the reaction system while maintaining the temperature and pressure at $115\pm5°$ C. and 1.0 to 3.0 kg/cm$^2$, respectively. After completion of the addition, the reaction system was matured at the reaction temperature for 2 hours and the unreacted propylene oxide was removed under reduced pressure. Subsequently, the reaction system was cooled, 0.3 g (total amount of the catalyst with respect to the final product: 0.20%) of KOH was additionally supplemented, the reaction system was sufficiently purged with nitrogen gas, a mixture comprising 176 g (4 moles) of ethylene oxide and 440.8 g (7.6 moles) of propylene oxide was gradually added while maintaining the temperature and pressure at $120\pm5°$ C. and 1.0 to 3.0 kg/cm$^2$, respectively. After completion of the addition, tion temperature for 2 hours and the unreacted propylene oxide was removed. Subsequently, a mixture comprising 270 g (6.1 moles) of ethylene oxide and 232 g (4 moles) of propylene oxide was gradually added while maintaining the temperature and pressure at $115\pm5°$ C. and 1.0 to 3.0 kg/cm$^2$, respectively. After completion of the addition, the reaction system was matured and the unreacted ethylene oxide and propylene oxide were removed. Then the reaction mixture was cooled, 0.44 g (total amount of the catalyst: 0.25% with respect to the final product) of KOH as a catalyst was additionally supplemented, the reaction system was sufficiently purged with nitrogen gas and sufficiently dehydrated at a high temperature under reduced pressure. Then 116 g (2 moles) of propylene oxide was gradually added to the reaction system while maintaining the temperature and pressure at $115\pm5°$ C. and 1.0 to 3.0 kg/cm$^2$, respectively. After completion of the addition, the reaction system was matured, the unreacted propylene oxide was removed, followed by cooling and addition of acetic acid to adjust the pH of the reaction system to 6 to 8 (Sample 8).

The same procedures used above were repeated except that the conditions listed in Table 2 were used to give Sample 9.

TABLE 2

| | RO · (PO)$_{n1}$ − [(EO)$_m$(PO)$_{n2}$] H (Component (A)) | | | | |
|---|---|---|---|---|---|
| Sample No. | Alkyl Group (ratio: wt %) | n1, m, n2 | [(EO)(PO)] Config. | EO/PO | By-product (%) |
| 6 | $C_{18}$ | 1, 10, 19 | random | 0.50 | 1.53 |
| 7 | $C_{16}/C_{18}$ = 30/70 | 3, 16, 15 | block | 0.67 | 2.30 |

TABLE 2-continued

| Sample No. | Alkyl Group (ratio: wt %) | RO·(PO)$_{n1}$ − [(EO)$_m$(PO)$_{n2}$] H (Component (A)) | | | | By-product (%) |
|---|---|---|---|---|---|---|
| | | n1, m, n2 | [(EO)(PO)] Config. | | EO/PO | |
| 8 | C$_{18}$ | 5, 15, 15 | random, block*[1] | | 0.75 | 2.53 |
| 9 | C$_{18}$/C$_{22}$ = 70:30 | 7, 18, 14 | " | | 0.86 | 2.85 |
| 10 | C$_{12}$ | 2, 18, 10 | block | | 1.50 | 2.34 |
| 11 | C$_{16}$/C$_{18}$ = 20/80 | 3, 18, 12 | block | | 1.20 | 2.45 |

*[1]: Ethylene oxide and propylene oxide are randomly added and then propylene oxide is further added.

Terminal added PO molar numbers are 5 for Sample 8 and 6 for Sample 9.

COMPARATIVE PREPARATION EXAMPLE 1

The same procedures used in Preparation Example 1 except that ethylene oxide (18 moles) and propylene oxide (18 moles) were added to stearyl alcohol (1 mole) in a block configuration so that the ratio of the total molar number of the added ethylene oxide to the total molar number of the added propylene oxide was equal to 1 to give Sample 12.

TABLE 3

| Sample No. | Alkyl Group | RO·(EO) − [(EO)(PO)] H | | | By-product (%) |
|---|---|---|---|---|---|
| | | Total EO; PO | [(EO)(PO)] Config. | EO/PO | |
| 12 | C$_{18}$ | 18; 18 | block | 1.0 | 2.56 |

PREPARATION EXAMPLE 5

The same procedures used in Preparation Example 3 except that 4 moles of propylene oxide were first added to one mole of stearyl alcohol and then ethylene oxide (16 moles) and propylene oxide (12 moles) were added to the resulting adduct so that the ratio of the total molar number of the added ethylene oxide to the total molar number of the added propylene oxide was equal to 1 to give Sample 13.

TABLE 4

| Sample No. | Alkyl Group | RO·(PO)$_{n1}$ − [(EO)$_m$(PO)$_{n2}$] H (Component (A)) | | | By-product (%) |
|---|---|---|---|---|---|
| | | n1, m, EO; PO | [(EO)(PO)] Config. | EO/PO | |
| 13 | C$_{18}$ | 4, 16, 12 | random | 1.0 | 2.48 |

COMPARATIVE PREPARATION EXAMPLE 2

Sample 14 was prepared by the same procedures used in Preparation Example 3 except for the condition set out in Table 5.

TABLE 5

| Sample No. | Alkyl Group (ratio: wt %) | n1, m, n2 | [(EO)(PO)] Config. | EO/PO | By-product (%) |
|---|---|---|---|---|---|
| 14 | C$_{12}$ | 30, 42, 9 | random | 1.08 | 2.89 |

EXAMPLE 1

Printed waste paper (weight ratio: offset-printed newspaper/magazine=7/3) as a starting material was cut into pieces of 3×3 cm, introduced into a pulper (available from Kumagai Riki Kogyo Co., Ltd.), warm water or water was added to control the temperature and the pulp concentration, pH of the mixture was adjusted by the addition of sodium hydroxide and sodium silicate and then 1.0% (effective component) of hydrogen peroxide and 0.35% of various deinking compositions were added. Subsequently, the pulper was operated for 7 minutes to give a pulp slurry. The resulting pulp slurry was centrifuged using a filter cloth of 80 mesh to dewater and concentrate the slurry to a consistency of 15% and water was added to adjust the pulp consistency to 5%. Then the pulper was operated for 3 minutes to further defiber. Warm water was added to adjust the pulp consistency to 1% and the slurry was subjected to flotation for 7 minutes using a Denver type floater (available from Kyokuto ShinkoCo. Ltd.). The resulting pulp slurry was then concentrated to a pulp consistency of 10% using a filter cloth of 80 mesh and diluted to 1% with water. Then a pulp sheet was prepared from the pulp slurry using a TAPPI sheet-making machine.

The brightness of the resulting pulp sheet was determined by a color and color difference meter (Nippon Denshoku Kogyo Co., Ltd.) according to the method defined in JIS P-8123 and the content of the remaining ink was determined by an image-analyzer (Luzex: available from Nikore Co., Ltd.) in terms of the rate of area of the resulting reclaimed paper on which ink remains.

The results obtained are summarized in Table 6. In Table 6, operability during flotation (effect of foams) was evaluated on the basis of the following criteria. Further the effect accomplished by the simultaneous use of the deinking compositions, Samples 3 and 8, was examined for various amounts. The results are listed in Table 7.

A: Operability is good;

B: Foams are formed slightly in excess, but do not affect the p operability.

C: Foams are formed rather insufficiently, but do not affect the operability.

D: Foams are excessly formed and the deinking operation is accordingly impracticable.

E: Foams are only slightly formed and accordingly the deinking operation is impracticable.

TABLE 6

| Test No. | Deinking Composition (wt %) | Deinking Conditions | | | Brightness | Residual Ink | Operability |
|---|---|---|---|---|---|---|---|
| | | PC | Temp. | pH | | | |
| 1 | No. 1/No. 7: 40/60 | 5 | 25 | 9.5 | 58.4 | 0.250 | B |
| 2 | No. 2/No. 6: 10/90 | 15 | 40 | 10.9 | 57.7 | 0.275 | C |
| 3 | No. 3/No. 8: 20/80 | 5 | 40 | 9.8 | 58.1 | 0.258 | A |
| 4 | No. 4/No. 9: 70/30 | 25 | 65 | 10.5 | 58.2 | 0.254 | B |

TABLE 6-continued

| Test No. | Deinking Composition (wt %) | Deinking Conditions | | | Brightness | Residual Ink | Operability |
|---|---|---|---|---|---|---|---|
| | | PC | Temp. | pH | | | |
| 5 | No. 5/No. 7: 55/45 | 15 | 30 | 11.5 | 58.4 | 0.251 | A |
| 6 | No. 1/No. 8: 33/67 | 15 | 40 | 10.9 | 58.0 | 0.260 | A |
| 7 | No. 2/No. 10: 40/60 | 15 | 40 | 11.2 | 57.4 | 0.280 | B |
| 8 | No. 3/No. 7: 70/30 | 15 | 40 | 11.3 | 59.2 | 0.214 | A |
| 9 | No. 3/No. 11: 70/30 | 15 | 40 | 11.1 | 58.6 | 0.233 | A |
| 10 | No. 2 | 15 | 40 | 10.9 | 55.6 | 0.376 | B |
| 11 | No. 6 | 15 | 40 | 10.9 | 55.7 | 0.380 | E |
| 12 | No. 12 | 15 | 40 | 10.9 | 55.3 | 0.391 | A |
| 13 | No. 13 | 15 | 40 | 10.9 | 55.4 | 0.388 | B |
| 14 | No. 7 | 15 | 40 | 10.8 | 55.9 | 0.363 | A |

Test Nos. 1~9: Examples; Test Nos. 10~14: Comparative Examples.

TABLE 7

| Deinking Composition (wt %) | Amount Added at Defibering Step | Brightness | Residual Ink | Operability |
|---|---|---|---|---|
| No. 3/No. 8: 20/80 | 0.08 | 57.0 | 0.293 | B |
| | 0.10 | 57.5 | 0.276 | C |
| | 0.35 | 58.1 | 0.258 | A |
| | 1.00 | 58.7 | 0.232 | A |
| | 2.00 | 59.1 | 0.221 | B |
| | 2.50 | 58.4 | 0.235 | D |

Defibering Conditions: PC = 5%; Temp. = 40° C. and pH = 9.8.

EXAMPLE 2

Printed waste paper (weight ratio: offset-printed newspaper/magazine=7/3) as a starting material was cut into pieces of 3×3 cm, introduced into a pulper (available from Kumagai Riki Kogyo Co., Ltd.), warm water or water was added to control the temperature and the pulp consistency and pH of the mixture was adjusted by the addition of sodium hydroxide and sodium silicate. Then 0.15% of deinking compositions as listed in Table 8 were added and the pulper was operated for 7 minutes to give a pulp slurry. The resulting pulp slurry was centrifuged using a filter cloth of 80 mesh to dewater and adjust the pulp concentration of the slurry and pH of the slurry was adjusted by the addition of sodium hydroxide and sodium silicate.

Thereafter, 1.7% of hydrogen peroxide and 0.1% of deinking composition were added and the mixture was aged in a thermostatic oven.

After the aging, the pulp consistency of the slurry was again adjusted to 5% with water and the pulper was operated for 3 minutes to perform defibering. Then warm water was added to control the pulp consistency to 1% and the slurry was subjected to flotation at 30° C. for 7 minutes using a Denver type flotater (available from Kyokuto Shinko Co., Ltd.). The resulting pulp slurry was then concentrated to a pulp consistency of 10% using a filter cloth of 80 mesh and diluted to 1% with water. Then a pulp sheet was prepared from the slurry using a TAPPI sheet-making machine.

The brightness of the resulting pulp sheet was determined by a color measuring color-difference meter (Nippon Denshoku Kogyo Co., Ltd.) according to the method defined in JIS P-8123 and the content of the remaining ink was determined by an image-analyzer (Luzex: available from Nikore Co., Ltd.) in terms of the rate of area of the resulting paper on which ink remains.

The results obtained are summarized in Table 8. Further the effect accomplished by the simultaneous use of the deinking compositions, Samples 2 and 6 was examined for various amounts. The results are listed in Table 9.

TABLE 8

| Test No. | Deinking Composition (wt %) | Defibering Conditions | | | Aging Conditions | | | Brightness | Residual Ink | Operability |
|---|---|---|---|---|---|---|---|---|---|---|
| | | PC | Temp. | pH | PC | Temp. | pH | | | |
| 1 | No. 1/No. 9: 30/70 | 25 | 55 | 10.4 | 25 | 55 | 10.5 | 59.0 | 0.231 | A |
| 2 | No. 2/No. 6: 20/80 | 20 | 65 | 10.1 | 30 | 60 | 9.6 | 58.8 | 0.235 | A |
| 3 | No. 3/No. 7: 60/40 | 5 | 35 | 9.8 | 20 | 55 | 10.8 | 59.3 | 0.223 | A |
| 4 | No. 4/No. 8: 45/55 | 15 | 55 | 10.3 | 20 | 55 | 10.9 | 58.9 | 0.233 | A |
| 5 | No. 5/No. 7: 90/10 | 5 | 35 | 10.8 | 25 | 60 | 11.2 | 59.3 | 0.222 | A |
| 6 | No. 4/No. 7: 29/71 | 15 | 55 | 10.3 | 20 | 55 | 10.9 | 59.4 | 0.221 | A |
| 7 | No. 3 | 5 | 35 | 9.8 | 20 | 55 | 10.8 | 56.5 | 0.341 | B |
| 8 | No. 8 | 15 | 55 | 10.3 | 20 | 55 | 10.9 | 56.8 | 0.339 | A |
| 9 | No. 12 | 5 | 35 | 9.8 | 20 | 55 | 10.8 | 56.3 | 0.346 | A |
| 10 | No. 13 | 15 | 55 | 10.3 | 20 | 55 | 10.9 | 56.4 | 0.341 | A |

Test Nos. 1~6: Examples; Test Nos. 7~10: Comparative Examples.

TABLE 9

| Deinking Composition (wt %) | Amount Added at Defibering | Amount Added at Aging | Brightness | Residual Ink | Operability |
|---|---|---|---|---|---|
| No. 2/No. 6 (20/80) | 0.15 | not added | 58.0 | 0.251 | C |
| | 0.15 | 0.08 | 58.5 | 0.245 | A |
| | 0.15 | 0.10 | 58.8 | 0.235 | A |
| | 0.15 | 0.35 | 59.3 | 0.223 | A |
| | 0.15 | 1.50 | 60.2 | 0.203 | B |
| | 0.15 | 2.50 | 59.7 | 0.218 | D |
| | 0.10 | not added | 57.4 | 0.275 | C |
| | 0.10 | 0.10 | 58.3 | 0.240 | A |
| | 0.10 | 0.30 | 58.9 | 0.230 | A |
| | 0.10 | 1.50 | 60.1 | 0.201 | B |

TABLE 9-continued

| Deinking Composition (wt %) | Amount Added at Defibering | Amount Added at Aging | Brightness | Residual Ink | Operability |
|---|---|---|---|---|---|
| | 0.10 | 2.20 | 59.8 | 0.215 | D |

EXAMPLE 3

Printed waste paper (weight ratio: offset-printed newspaper/magazine=7/3) as a starting material was cut into pieces of 3×3cm, introduced into a pulper (available from Kumagai Riki Kogyo Co., Ltd.), warm water was added to control the temperature to 40° C. and the pulp concentration of 40%, pH of the mixture was adjusted to 10.5 by the addition of sodium hydroxide and sodium silicate and then defiber treatment was conducted for seven minutes after various deinking compositions set out in Table 10 were added thereto in an amount of 0.15 wt %. The resulting pulp slurry was centrifuged using a filter cloth of 80 mesh to dewater and control the concentration of the slurry, after which pH of the slurry was adjusted to 11 by the addition of sodium hydroxide and sodium silicate. Subsequently, hydrogen peroxide and the deinking compositions were added thereto in an amount of 1.5% and 0.2%, respectively to age the slurry in a temperature-controlled bath at a temperature of 50° C. for 3 hours. After aging, water was added to adjust the pulp consistency to 5%. Then the pulper was operated for 3 minutes to further defiber. Warm water was added to adjust the pulp consistency to 1% and the slurry was subjected to flotation for 7 minutes at a temerature of 30° C. using a Denver type flotater (available from Kyokuto Shinko Co., Ltd.). The resulting pulp slurry was then concentrated to a pulp consistency of 10% using a filter cloth of 80 mesh and diluted to 1% with water. Then a pulp sheet was prepared from the pulp slurry using a TAPPI sheet-making machine.

The brightness and b value of the resulting pulp sheet was determined by a color and color difference meter (Nippon Denshoku Kogyo Co., Ltd.) according to the method defined in JIS P-8123 and the content of the remaining ink was determined by an image-analyzer (Luzex: available from Nireco Co., Ltd.) in terms of the amount of fine ink particles of not larger than 4 μm.

The results obtained are summarized in Table 10. In this respect, please note that b value is obtained in Lab color system by Hunter color difference meter, and that smaller the amount of fine ink particles, higher the b value, so that the b value can be used as an indicator of the amount of fine ink particles.

TABLE 10

| Test No. | Deinking Composition (wt %) | Brightness | Number of fine ink particles* | b value |
|---|---|---|---|---|
| 1 | No. 6/No. 7: 90/10 | 58.5 | 149 | 8.3 |
| 2 | No. 6/No. 11: 30/70 | 59.0 | 126 | 8.6 |
| 3 | No. 13/No. 7: 40/60 | 58.8 | 133 | 8.4 |
| 4 | No. 13/No. 11: 20/80 | 58.6 | 147 | 8.4 |
| 5 | No. 6/No. 7/No. 3: 30/30/40 | 59.3 | 101 | 9.0 |
| 6 | No. 6 | 55.9 | 621 | 6.2 |
| 7 | No. 7 | 55.8 | 583 | 6.4 |
| 8 | No. 13 | 55.2 | 668 | 5.9 |
| 9 | No. 14 | 53.6 | 743 | 5.8 |

*number of the fine ink particles of not larger than 4 μ. Nos. 1 to 5 are the present invention whereas Nos. 6 to 9 are the comparative examples.

What is claimed is:

1. A flotation method for deinking printed waste paper comprising the steps of defibering printed waste paper in the presence of a deinking composition to form a pulp slurry and then separating and removing separated ink particles from the pulp slurry through flotation, the deinking composition comprising:

(1) 99.7 to 97% by weight of a mixture comprising monoalkyl ethers of ethylene oxide/propylene oxide copolymers represented by the following general formulas (A1) and (A2):

$$R^3O-(PO)_{n3}-(EO)_{ma}\text{-}(PO)_{n4}-H \qquad (A\text{-}1),$$

$$R^4O-(PO)_{n5}-[(EO)_{mb}\text{-}(PO)_{n6}]-H \qquad (A\text{-}2)$$

wherein the averaged molar numbers ma and mb of the added ethylene oxide moieties each range from 10 to 30, averaged molar numbers (n3+n4) and (n5+n6) of the added propylene oxide moieties each range from 8 to 35, mixing weight ratio of the compound (A-1) to the compound (A-2) ranges from 10:90 to 90:10, $R^3$ and $R^4$ represent an alkyl group having 12 to 22 carbon atoms, ma/(n3+n4)=0.5~1.5, mb/(n5+n6)=0.5~1.5, EO and PO represent ethylene oxide and propylene oxide units respectively, $(EO)_{ma}\text{-}(PO)_{n4}$ is in the form of a block configuration and $[(EO)_{mb}\text{-}(PO)_{n6}]$ is in the form of a random configuration; and (2) about 0.3 to about 3.0% by weight of a polyalkylene oxide selected from the group consisting of polyethylene oxides, polypropylene oxides and ethylene oxide/propylene oxide copolymers.

2. A deinking composition for regeneration of waste paper by flotation which comprises:

(1) 99.7 to 97% by weight of a mixture comprising monoalkyl ethers of ethylene oxide/propylene oxide copolymers represented by the following general formulas (A-1) and (A-2):

$$R^3O-(PO)_{n3}-(EO)_{ma}\text{-}(PO)_{n4}-H \qquad (A\text{-}1)$$

$$R^4O-(PO)_{n5}-[(EO)_{mb}\text{-}(PO)_{n6}]-H \qquad (A\text{-}2)$$

wherein the averaged molar numbers ma and mb of the added ethylene oxide moieties each range from 10 to 30, the averaged molar numbers (n3+n4) and (n5+n6) of the added propylene oxide moieties each range from 8 to 35, the mixing weight ratio of the compound (A-1) to the compound (A-2) ranges from 10:90 to 90:10, $R^3$ and $R^4$ represent an alkyl group having 12 to 22 carbon atoms, ma/(n3+n4)=0.5~1.5, mb/(n5+n6)=0.5~1.5, EO and PO represent ethylene oxide and propylene oxide units respectively, $(EO)_{ma}\text{-}(PO)_{n4}$ is in the form of a block configuration and $[(EO)_{mb}\text{-}(PO)_{n6}]$ is in the form of a random configuration; and (2) about 0.3 to about 3.0% by weight of a polyalkylene oxide selected from the group consisting of polyethylene oxides, polypropylene oxides and ethylene oxide/propylene oxide copolymers.

* * * * *

UNITED STATES PATENT AND TRADEMARK OFFICE
CERTIFICATE OF CORRECTION

PATENT NO. : 5,417,808
DATED : May 23, 1995
INVENTOR(S) : Yutaka OKAMOTO et al

It is certified that error appears in the above-indentified patent and that said Letters Patent is hereby corrected as shown below:

TITLE PAGE:

In Section [75], delete "OKamoto" and insert -- Okamoto --.

Signed and Sealed this

Eleventh Day of July, 1995

Attest:

BRUCE LEHMAN

Attesting Officer     Commissioner of Patents and Trademarks